May 23, 1961  W. J. LEWIS ET AL  2,985,021
SINGLE AXIS ACCELEROMETER
Filed June 16, 1958  5 Sheets-Sheet 1
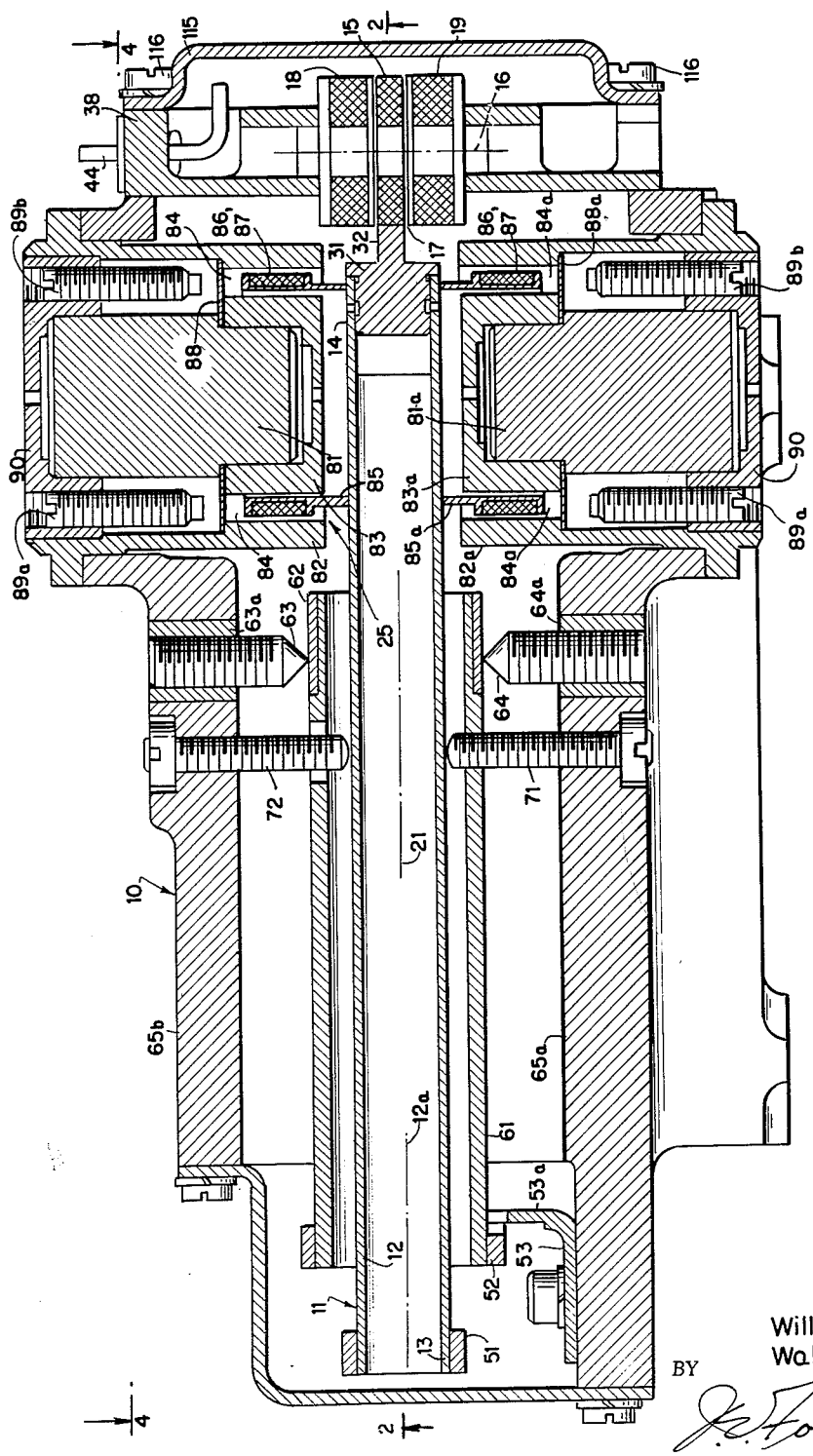
FIG.1
INVENTORS
William J. Lewis
Walter J. Krupick
BY 
ATTORNEY

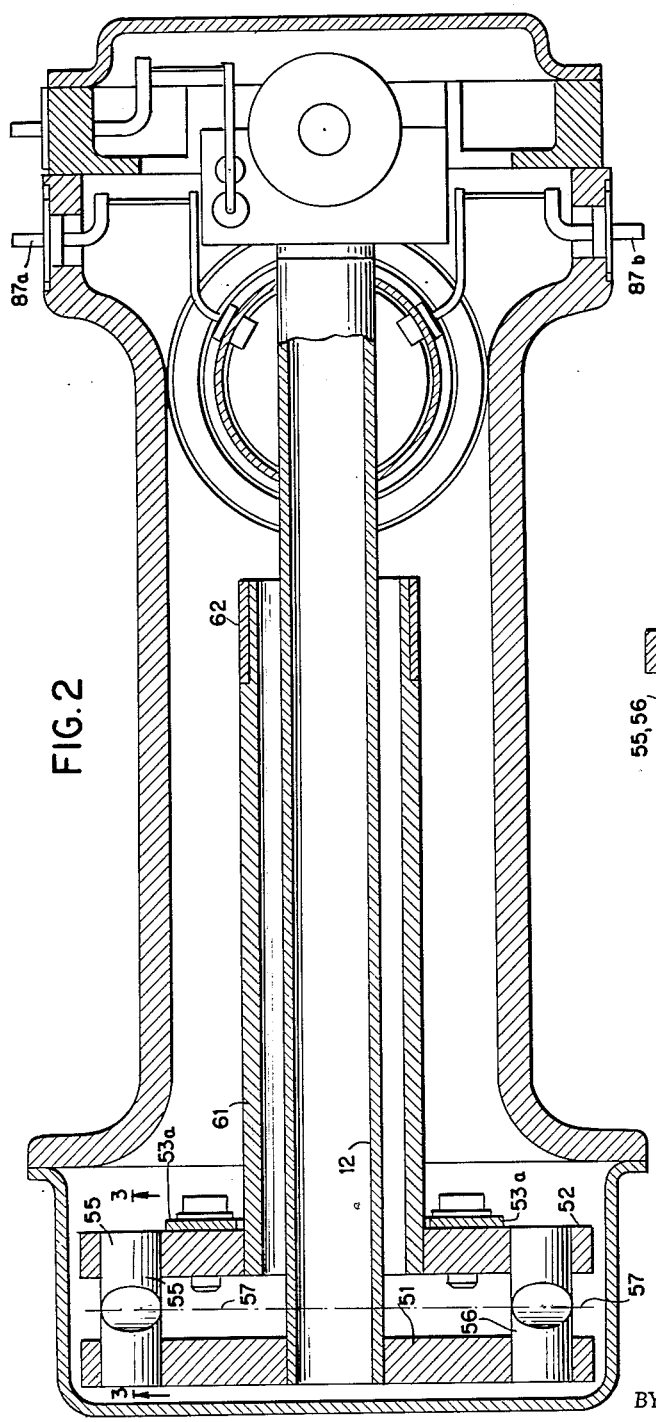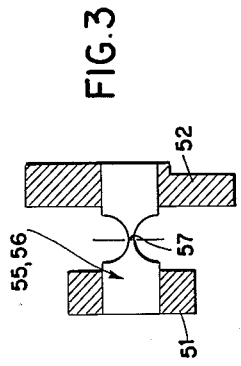

May 23, 1961   W. J. LEWIS ET AL   2,985,021
SINGLE AXIS ACCELEROMETER

Filed June 16, 1958   5 Sheets-Sheet 3

INVENTORS
William J. Lewis
Walter J. Krupick
BY
ATTORNEY

May 23, 1961  W. J. LEWIS ET AL  2,985,021
SINGLE AXIS ACCELEROMETER
Filed June 16, 1958  5 Sheets-Sheet 4

INVENTORS
William J. Lewis
Walter J. Krupick
BY
ATTORNEY

May 23, 1961 W. J. LEWIS ET AL 2,985,021
SINGLE AXIS ACCELEROMETER
Filed June 16, 1958 5 Sheets-Sheet 5
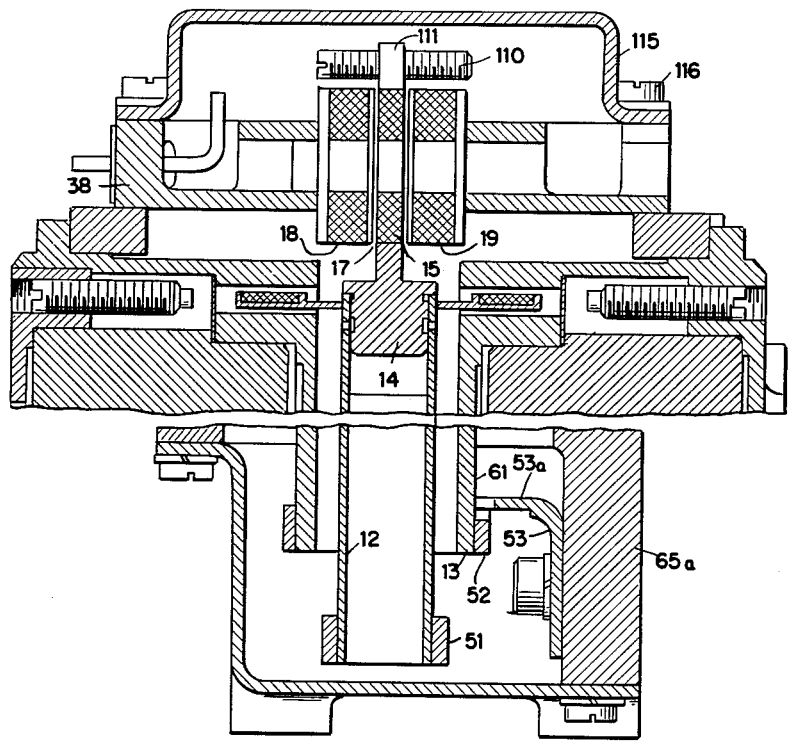
FIG. 7
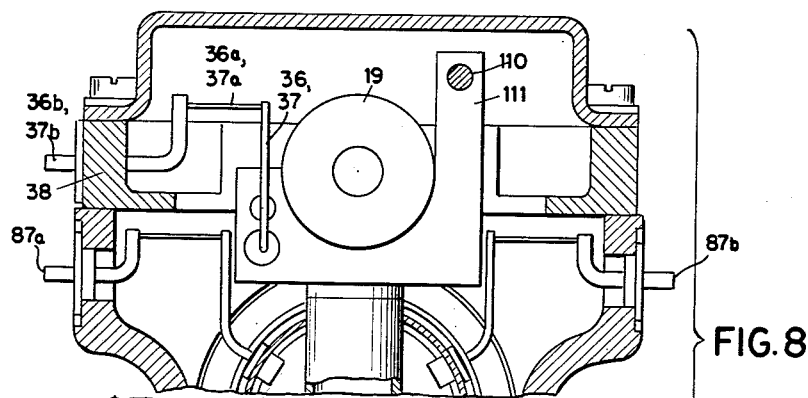
FIG. 8
INVENTORS
William J. Lewis
Walter J. Krupick
BY 
ATTORNEY

United States Patent Office 2,985,021
Patented May 23, 1961

2,985,021
SINGLE AXIS ACCELEROMETER

William J. Lewis, Glen Rock, and Walter J. Krupick, Franklin, N.J., assignors to General Precision, Inc., Wilmington, Del., a corporation of Delaware Filed June 16, 1958, Ser. No. 742,316

13 Claims. (Cl. 73—517)

This invention relates to accelerometers and is directed particularly to accelerometers constructed to operate within a preferred plane, and to respond substantially only to forces along a pre-determined axis in that plane, which may be selected as either the vertical plane or the horizontal plane, and the force axis as vertical or horizontal.

The primary object of this invention is to provide a highly sensitive accelerometer, that will respond to external accelerating forces operating in either direction along a predetermined axis.

Another object of the invention is to provide an accelerometer of the foregoing type having a simple construction which permits an extremely fine adjustment to compensate for small mechanical deviations from an ideal relation of balance, due to variations within even a small range of manufacturing tolerances.

A further object of the invention is to provide an accelerometer which is constructed to utilize the construction and the principles of a pendulum, with a simple and novel supporting structure that permits the pendulum of the accelerometer to be very accurately and sensitively positioned with respect to an adjusted virtual pivot line, together with means for suitably balancing and biasing the pendulum to align its physical axis with a virtual ideal inertial axis to compensate for the force of gravity, depending upon whether the accelerometer is disposed and used to measure forces in a vertical or gravity axis, or to measure forces in a selected horizontal axis.

An accelerometer constructed in accordance with the principles of this invention comprises generally a pivoted arm, here in the form of a tube, whose axis is to be normally co-axial with a main inertial axis, with one end of the arm pivoted and the other or free end of the arm carrying a pick-off signal coil. The signal coil is disposed to be movable in an air-gap transversed by a magnetic field from suitable exciting coils whereby movement of the pick-off signal coil will induce a voltage signal that may be utilized externally for indication, measurement or control purposes.

In order to permit the accelerometer with its pick-off signal coil to respond instantaneously, from time to time, to different external forces, the accelerometer is provided with electro-magnetic torquer means for applying restoring forces to the pendulum to restore it to its normal original neutral position. Such restoring force is developed by amplification of the signal force generated by the pick-off signal coil.

One of the features of the construction of this accelerometer is the pivotal mounting for the pendulum, whereby a very sensitive pivot element of relatively small dimension is formed as an operative part of a piece of substantial dimension to provide an extremely fine but strong pivot.

Another feature of the invention is an arrangement whereby extremely fine adjustments may be made in the positioning of the pivot support, to enable the physical axis of the pendulum to be adjustably tilted very accurately to be disposed in alignment with or parallel to an inertial axis.

When the accelerometer is to be used to measure a horizontal force, the pendulum is disposed in vertical position, accurately adjusted for balance, so the movement of the free end will be in a horizontal line and utilized to indicate the presence of a horizontal force to be detected.

When the accelerometer is to measure a vertical force, the pendulum is disposed with its axis in a horizontal position. The adjusting means permits the physical axis of the pendulum to be adjusted very accurately to a position exactly perpendicular to the gravity axis. In such use, the pendulum is necessarily supported as a cantilever. For accuracy of response, its cantilever weight is additionally balanced electro-magnetically to position the physical axis properly in true horizontal position.

The construction of an accelerometer made in accordance with the principles of this invention is illustrated in the accompanying drawings, in which—

Figure 1 is a longitudinal sectional view of an accelerometer disposed as a vertical accelerometer, that is, to measure forces along and through the vertical or gravitational axis;

Figure 2 is a plan view taken mainly along a horizontal section through the line 2—2, Figure 1, and looking downward on such horizontal section, with portions of the signal coil structure in plan;

Figure 3 is a vertical sectional view of a coupling unit, taken along lines 3—3 of Figure 2, showing how the coupling is formed to establish a thin section to define a pivot line;

Figure 7 is a broken vertical front section through the accelerometer when disposed for detecting forces in a horizontal direction;

Figure 8 is a broken vertical side section through the accelerometer of Figure 7.

Figure 4:
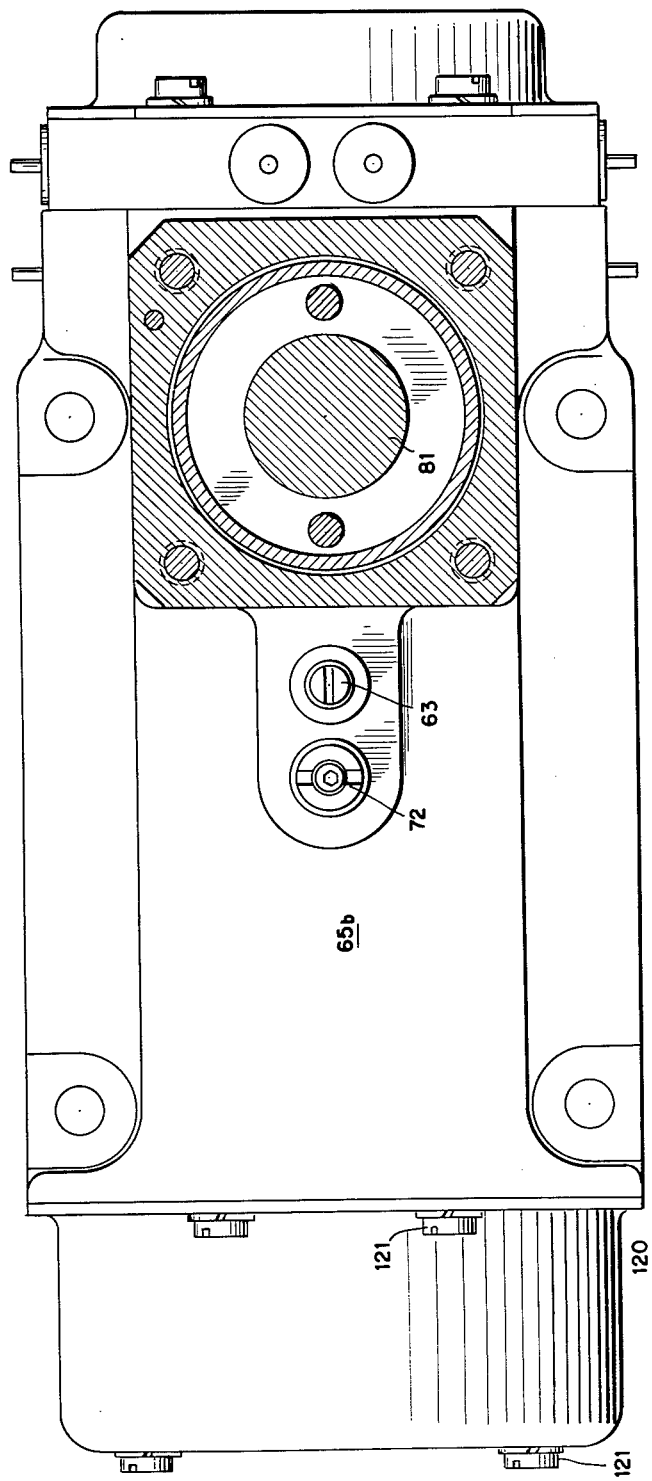
Figure 4 is a plan view, partially in section, of the accelerometer in Figure 1, and taken along line 4—4 of Figure 1.

As shown in Figure 1, one modification of an accelerometer 10, constructed in accordance with the principles of this invention, comprises, generally, a horizontally disposed pendulum 11 consisting of a pendulous arm 12, in the form of a cylindrical tube, supported pivotally at its effective lower end 13 and free to oscillate its effective upper or free end 14 which carries a pick-off or signal-generating coil 15 for limited movement along a vertical axis 16 and in an airgap 17 between two stationary excitation or field coils 18 and 19 which are disposed above and below the airgap 17 to define the limits of movement of the pick-off signal coil 15.

In the normal neutral position of the accelerometer 10, when horizontally disposed as shown in Figure 1, the physical axis of the pendulum 11, which may be for the present purposes considered to be the physical axis 12a of the pendulous cylinder 12, should coincide with the inertial axis 21 of the accelerometer. Such coincidence is established by suitable adjusting and supporting means presently to be described. The inertial axis 21 is the virtual or ideal axis or center-line of action of the pendulum in absolute neutral or balanced position. When the pendulum is balanced, its effective longitudinal axis 12a should coincide with such inertial axis 21.

Since the pendulum is supported as a cantilever, the free end will tend to droop from its ideal neutral position. A bias supporting force is provided to raise the free end of the pendulum to its neutral position. However, in order that the pendulum may still be free to move up or down from such neutral position, the bias supporting force is provided as a suitable electro-magnetic suspension force.

The electro-magnetic suspension force is established by a restoring coil 87 which is part of and is supported physically in the airgap of a torquer unit 25. The torquer unit 25 serves also to provide the appropriate and necessary restoring force to restore the accelerometer to its normal neutral central position immediately upon the occurrence of a deviation of the accelerometer pendulum in response to an external acceleration force. The restoral action is developed by appropriate action of the signal induced in the pick-off signal coil 15 when that pick-off signal coil 15 is displaced by deviation of the pendulum in response to a force along the vertical axis. The direction of the deviation of the pendulum determines the reverse direction of the restoral force.

The accelerometer, thus comprises, generally, the pendulous arm 11, the pick-off signal coil 15, and the restoring system or torquer 25.

The pendulous arm 11 is shown as comprising the symmetrical cylindrical tube 12 with a plug 31 disposed in and closing the upper end 14 of the tube. The plug 31 embodies an axially extending bracket arm 32 which serves as a supporting mount for the pick-off signal coil 15.

The pick-off signal coil 15 is shown as being generally of pancake annular form in Figures 1 and 2. It is concentrically disposed around the vertical force axis 16, and is co-axially disposed between the two excitation field coils 18 and 19 which are suitably differentially energized to establish the magnetic flux field across the airgap 17 within which the pick-off signal coil 15 is free to move.

Figure 6:
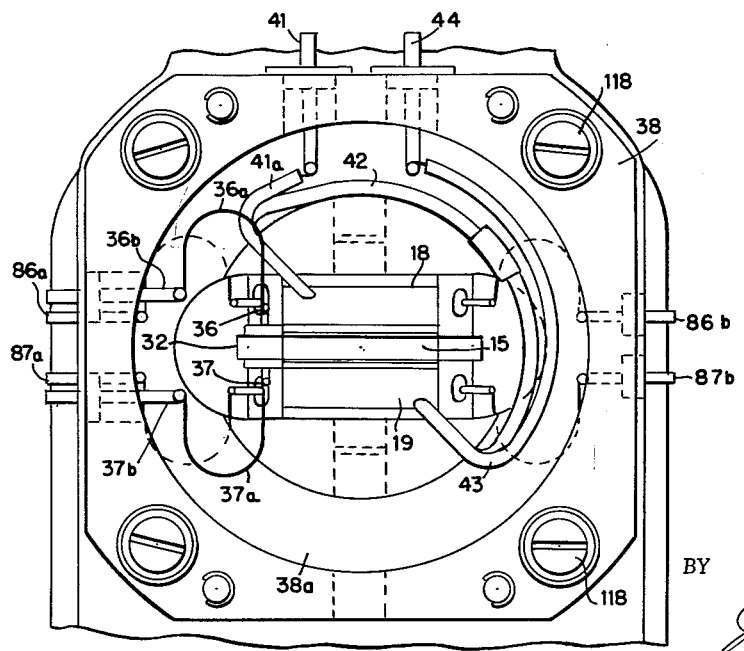
Figure 6 is an end elevational view of the unit in Figure 1, with the upper end cover removed to expose the signal coil assembly at the free end of the pendulum.

The two ends of the pick-off signal coil 15, as shown in Figure 6, are connected to two terminals 36 and 37 carried by the movable bracket arm 32 at the end of the pendulum. Those two movable terminals are connected by suitable pigtail connections 36a and 37a to two sealed terminals 36b and 37b extending through an annular gap 38a surrounding the wall of a supporting end bracket 38, which is utilized to support the sealed terminals to permit external electrical connections to be made to the coils 15, 18 and 19.

The two exciting stator coils 18 and 19, as shown more fully in Figure 6, are connected in series from a sealed terminal 41 through a conductor 41a, through coil 18, thence through a joining conductor 42 which connects the outgoing terminal of coil 18 to the ingoing terminal of coil 19, with the outgoing end of coil 19 connected to a conductor 43 which leads to a sealed terminal 44.

The two stator field coils 18 and 19 are connected in series but are energized to be opposingly or differentially magnetically effective with respect to the gap flux. That is, the flux polarity developed by the two stator field coils 18 and 19 is the same at the airgap so that the two flux fields are in opposition. In that manner, movement of the pick-off signal coil 15 induces a voltage in the coil 15 with a polarity depending upon the direction of movement.

Two additional sets of terminals are provided on the terminal end-bracket 38 to permit connections to be made to the coils of the torquer 25.

The construction and manner of operation of the pivotal supporting means and the adjusting means for the pendulum may now be considered.

Figure 5:
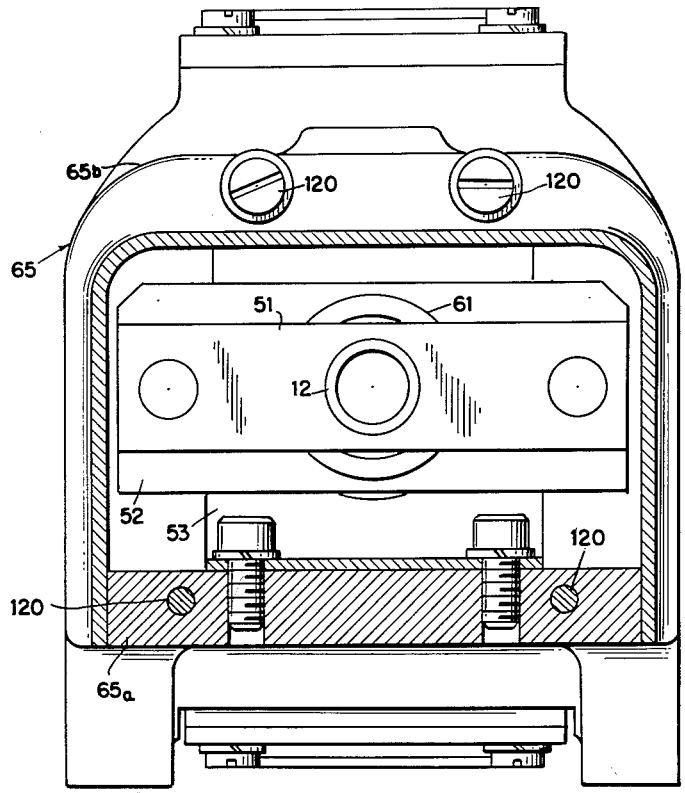
Figure 5 is an end elevational view of the unit in Figure 1, with the lower end cover cut away to expose the pivoted mounting bar for the pendulum.

As shown in Figures 1, 2 and 5, the pivoted end of pendulum rod 12 is anchored on a floating cross-arm 51, which is in turn resiliently supported from a fixed bar 52 that is anchored at two spaced points to an L-shaped bracket 53.

The floating cross-arm 51 is supported from the fixed bar 52 by two flexible connectors 55 and 56 that are specially constructed, as shown more fully in Figure 3, to provide a thin but relatively wide section to define a virtual pivot line or axis 57 about which the floating cross-arm 51 and its supported pendulous tube 12 may be pivotally oscillated for normal operation, or adjusted for accurate positioning.

The flexible pivotal connectors 55 and 56 are preferably made of a material, usually metal or metal alloy, which will have a natural inherent resiliency and flexibility. Beryllium copper has been used and found to be satisfactory. A modified metal alloy manufactured and sold by the Wilber B. Driver Company under the trade name Elgaloy has also been found to be extremely satisfactory for this purpose, because of its high density and fine grain structure, and resistance to fatigue.

In spite of the extreme care in making the pivotal couplings 55 and 56, during manufacture, and in mounting the couplings between the cross-arm 51 and the fixed bar 52, the dimensions and characteristics of the couplings may vary slightly within a prescribed set of tolerance limits. Such slight differences may be enough to introduce a minute tilt in the axis of the pendulous tube 12 sufficient to cause a deviation angle between the physical axis of the pendulum and the inertial axis corresponding to the ideal position of the physical axis of the pendulum in neutral position. Such deviation angle even though small, could introduce an error in the generated signal, if not corrected.

In order to correct for any such mechanical-assembly tilt in the pendulum, an adjustable counter bias force is introduced mechanically by means of an adjustable lever 61. The lever 61 is here in the form of a tube of which one end is fixedly anchored at and on the fixed-bar 52, and the other end is extended lengthwise away from the bar 52 to provide a lever arm by which an adjusting force may be applied to the fixed arm 52 to tilt the bracket 53 very slightly but sufficiently to adjust the neutral position of the cross-arm 51 together with the anchored end of the pendulous tube 12 and the axis of that tube.

The adjustable tubular lever 61, as shown in Figures 1 and 2, is provided with a hardened outer ring 62 against which adjustment pressure forces may be applied through two diametrically opposed adjusting screws 63 and 64 suitably supported in threaded sockets 63a and 64a that are anchored in the base 65a and top plate 65b of the housing casting 65.

The adjusting force impressed on the lever 61 operates on the bracket 63 which is formed of a metal that will permit the L-shaped bracket to have a slight resiliency sufficient to enable the upwardly extending cantilever arm 53a of the bracket to be tilted or displaced through a small angle sufficient to provide the necessary adjustment desired in the pendulous tube 12 to align its physical axis 12a with the inertial axis 21.

Once the pendulous arm 12 has been located in its proper neutral position, a pair of suitable stop screws 71 and 72 in base plate 65a and top plate 65b, where easy access may be had to those screws for their adjustment, are then adjustably positioned to limit the permitted angular deviation of the pendulous tube 12 in response to any external forces. Those stops serve to prevent the signal induction coil 15 from bumping the stationary coil structure.

When the pendulum in Figure 1 is acted on by an external force to cause the signal coil 15 to move up or down along the vertical axis 16, a signal is generated in the coil 15 and is immediately utilized to restore the pendulum to its normal neutral position as soon as possible, in order that the pendulum may be again immediately available to respond to any subsequent new external force or change in such external force.

In order to establish a restoring force to act on the pendulum, the electromagnetic torquer 25 previously referred to is provided.

The torquer 25 consists of two electromagnetic construction assemblies, each including a permanent magnet 81 or 81a with an associated magnetic core structure consisting of an outer cylindrical sleeve 82 or 82a whose upper end encircles a magnet end piece in the form of an inner cylindrical sleeve 83 or 83a co-axially and concentrically to define an annular airgap 84. Two cylindrical coil mounts 85 and 85a are secured to the free end of the pendulous tube 12 on diametrically opposite sides of the tube. Each coil-mount dips down into its airgap 84 or 84a and each coil-mount supports two coils 86 and 87 that are suitably energized to react with the flux field across the associated airgap 84 or 84a to produce appropriate and desired lifting forces for the pendulous arm 12, for the purposes to be presently described.

The first coil 86 serves to provide a constant lifting force sufficient to balance the gravity pull on the free end of the pendulous tube 12 and to balance the tendency of the tube to droop because of its disposition as a cantilever. The function of the second coil 87 is to provide the transient restoring force necessary to restore the pendulous tube back to its normal neutral position whenever an upward or downward external force has occurred that would tend to move the supporting structure of the pendulum in the forced direction and to cause the pendulum free end and the signal coil 15 to tend to move in the opposite direction away from neutral position due to inertia of the pendulum and the coil.

Returning to the torquer structure, proper flux fields across the airgaps 84 from the permanent magnets are established by the provision of suitable magnetic shunts. One shunt is shown as an annular ring or washer 88 disposed between the inner and outer magnet shells 83 and 82 at the lower end of each airgap 84. Additional adjusting means consist of two adjustable screws 89a and 89b which extend upward from a central magnet cover plate 90 that constitutes part of the outer shell 82 for each magnet structure. The adjusting screws 89a and 89b are adjustably movable closer to or further away from the inner ends of the inner shell 83 adjacent each airgap, in such manner as to additionally control the amount of working flux across the airgap by varying the shunting effect of those two screws. The space between each screw 89a and 89b and one face of the annular ring or washer 88a, located near the tips of the screws 89a, 89b, and the inner magnet shell 82 serves as an adjustable airgap parallel to the main airgap 84.

Suitable terminals are provided for the balancing and the restoring coils 86 and 87, shown as 86a and 86b, and 87a and 87b, in Figures 2, 6 and 8.

Figure 9:
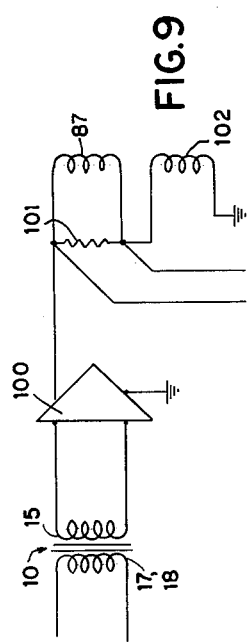
Figure 9 is a schematic circuit diagram of the circuit including the signal coil and torquer.

In Figure 9, the simple schematic functional circuit diagram shows how the signal from the signal coil 15 is derived from the excitation windings 17 and 18 and fed to a suitable amplifier 100 and thence through the restoring coil 87 of the accelerometer herein to a resistor 101 and the torquer coil 102 of the associated gyro in the platform system with which the accelerometer herein is used. The resistor 101 provides a voltage drop for other uses not involved here in the operation of the accelerometer.

Where the accelerometer is desired to detect a horizontal force, the structure is disposed as in Figures 7 and 8, with the pendulum in vertical position, parallel to the gravity force vector. In this case, the gravity balancing coil is not needed or used. However, in addition to the pivot adjusting means previously described, a mass balance is provided, shown as a threaded screw 110 supported on an extension arm 111 of the bracket 14 that supports the signal coil 15.

A cap 115 covers the coil assembly at the end of the structure, and is removably secured by four bolts 116 fitting into terminal block 38 that is otherwise anchored on the housing casting body by bolts 118. The opposite end of the assembly is closed by a cap 120, secured to the base casting by bolts 121.

Thus by the construction of the accelerometer disclosed herein, a very sensitive force-responsive detector is provided for detecting accelerations in a vertical or in a horizontal direction parallel to the axis of the detector coil 15, as it may be disposed.

What is claimed is:

1. A single-axis accelerometer to respond to forces along such predetermined force axis, and disposed longitudinally along an orthogonal physical axis, said accelerometer comprising a base plate having a major dimension in general alignment with the physical axis of the accelerometer;

a pendulous arm disposed to be substantially parallel to said physical axis, with one end of the arm to serve as a pivotal end and the other end of the arm to serve as the free or bob end of a pendulum;

stationary bracket means fixed to the base plate and disposed to serve as a support for the pivotal end of the pendulous arm; said bracket means including two flexible L-shaped brackets, each bracket having one arm anchored to the base on opposite sides of the pendulous arm, and having the other arm extending as a cantilever away from the base;

and resilient means mechanically coupling the pivotal end of the arm to said stationary bracket means to permit free oscillation of the arm in a preferred plane containing said physical axis and said force axis while substantially restricting oscillation of the arm in a transverse plane, the said resilient coupling means including a floating beam transverse to and straddling the pendulous arm, and said beam being fixedly secured to the pivotal end of the pendulous arm at a region intermediate the ends of the floating beam, said resilient coupling means also including a flexible connection between each end of the floating beam and the cantilever of one of the L-shaped brackets.

2. An accelerometer as in claim 1, in which the flexible connection between each floating beam end and the cantilever arm of the associated L-shaped bracket consists of a metallic piece of substantial cross-section having an intermediate region of the piece fluted on directly opposed radii on opposite sides to define a relatively thin center section along a medial plane transverse to the opposed radii to locate a virtual pivot line in such medial plane about which the floating beam may readily pivot to tilt the pendulous arm.

3. An accelerometer comprising a base;

a pendulous arm having a pivotal end and a free end, the free end being oscillatable in a predetermined plane containing a physical axis of the arm;

signal-producing means at the free end of the arm;

and pivotal supporting means at the pivotal end of the arm, said pivotal supporting means including a floating beam straddling such pivotal end of the arm and being fixedly secured to said pivotal end of the arm at a region intermediate the two ends of the floating beam, two stationary brackets anchored on the base on opposite sides of the plane of oscillation of the pendulous arm, and each bracket having a bracket arm extending away from the base as a cantilever, and a resilient connecting element between each cantilever bracket arm and one end of the floating beam, and means for adjustably tilting the pendulous arm to a predetermined neutral position, to establish substantial parallelism between the physical axis of the pendulous arm, and the inertial axis of the accelerometer, the adjustable tilting means consisting of an adjusting lever having two ends, with its one end secured to the floating beam and its second end free and disposed to extend longitudinally in the axial direction of the accelerometer, and means for impressing a transverse torque on the free end of the adjusting lever to minutely tilt the crossbar, and, consequently, the pendulous arm.

4. An accelerometer, as in claim 3, in which each resilient connecting element consists of a bar of metal fluted on directly opposed radii on opposite sides of a medial plane to define a flexible central region that locates a virtual pivotal line substantially orthogonal to the plane of oscillation of the pendulous arm.

5. An accelerometer to be disposed to operate in response to forces along a predetermined force axis, and disposed with its physical axis substantially parallel to an inertial longitudinal axis orthogonal to the force axis, said accelerometer comprising a base having a longitudinal dimension along said physical axis;

a pair of brackets secured to the base and spaced on the base transversely to the direction of the longitudinal dimension, each bracket having a cantilever arm extending away from the base;

a pendulous arm having a pivotal end and a free end spaced from the pivotal end, both ends locating the physical axis of such arm and of the accelerometer;

means supported on, and controlled by movement of, the free end of the pendulous arm for generating a signal voltage; said means including a coil supported on the movable free end of the pendulous arm, said coil serving as the means for generating a signal voltage;

stationary coil means adjacent the signal coil and serving, when energized, to establish a magnetic flux field in the path of movement of the movable coil;

and dynamo-electric means supported from the base structure and disposed transversely of the free end of the pendulous arm and serving upon energization, to apply a restoring torque to the pendulous arm to restore the pendulous arm to neutral position.

and resilient means supporting the pivotal end of the pendulous arm from said base, said supporting means including a floating beam secured to the pivotal end of the pendulous arm transversely to the physical axis, and a resilient connector between each end of the floating beam and one of the cantilever elements of the brackets, and means for adjustably tilting the supporting means and cantilever assembly to adjustably tilt the pendulous arm to a balanced neutral position to establish substantial parallelism between the physical axis of the pendulous arm and the inertial axis of the accelerometer, the means for adjustably tilting the supporting means consisting of an adjusting lever having two ends, with its one end secured to the supporting means and its second or free end disposed to extend longitudinally in the axial direction of the accelerometer, and means for impressing a transverse torque on the free end of the adjusting lever to minutely tilt the supporting means and consequently, the pendulous arm.

6. An accelerometer as in claim 5, in which the brackets are L-shaped, with one arm of each bracket fixed to the base and the other arm extending as a cantilever from the base, the material of the brackets being such as to provide some resiliency between the two arms of the bracket about the corner bend;

and said accelerometer comprising, further, a crossbeam secured to and supported by the extending cantilever arms of the two brackets;

the resilient means supporting the pendulous arm from the cross beam, including a pair of flexible connectors, each of which has a necked-down, pivot section integral therewith.

7. An accelerometer, as in claim 5, including a mass supported on the free end of the pendulous arm, said mass being adjustable transversely to the physical axis of the pendulous arm to balance the pendulous arm to a neutral position relative to the inertial axis of the accelerometer.

8. A single-axis accelerometer, comprising a base having a generally longitudinal dimension in the direction of a predetermined inertial axis;

a pair of brackets secured to the base on opposite sides of such intertial axis and each bracket having a cantilever arm extending away from the base and directed to be resiliently movable in a direction parallel to the intertial axis;

a cross-bar connecting the two cantilever arms at their outer free ends;

a floating cross-beam;

means resiliently supporting the cross-beam from the cross-bar, said supporting means consisting of two spaced connectors between the respective ends of the cross-beam and the cross-bar;

a pendulous arm having its one end secured to the cross-beam and having its free end extending away from the cross-beam substantially parallel to said inertial axis;

signal-inducing means controlled by the free end of said pendulous arm to induce a signal voltage in response to an external force operating on the free end of the pendulous arm;

and means for adjustably tilting the cross-bar together with the cantilever arms to correspondingly tilt the floating beam and the pendulous arm, the adjustable means for tilting the cross-bar consisting of a tubular element secured at its one end to the cross-bar and having its body extending coaxially along, and concentrically around the pendulous arm and away from the cross-bar;

with adjustable means disposed in juxtaposed positions on diametrically opposite sides of the body of the tubular element, said adjustable means consisting of screwthread elements to apply adjustable torques to the tubular element to tilt the cross-bar and thereby tilt the cross-beam to tilt the pendulous arm so the axis of the pendulous arm will parallel the inertial axis.

9. A single-axis accelerometer, as in claim 8, in which each resilient connector between the beam and the cross-arm consists of a metal element having an axis and being axially disposed between the cross-beam and the cross-bar, the body of the metal element between the beam and the cross-bar being fluted on diametrically opposite sides, whereby a thin section of the body of each metal element is formed to define a linear pivotal region orthogonal to the body axis.

10. A single-axis accelerometer, as in claim 8, comprising, additionally, electro-magnetic means responsive to a signal from the signal-inducing means in response to an oscillation movement of the pendulous arm and operative to establish a restoring force to tend to restore the pendulous arm to its neutral position.

11. An accelerometer to be disposed to operate in response to forces along a predetermined force axis, and disposed with its physical axis substantially parallel to an inertial longitudinal axis orthogonal to the force axis, said accelerometer comprising a base having a longitudinal dimension along said physical axis;

a pair of brackets secured to the base and spaced on the base transversely to the direction of the longitudinal dimension, each bracket having a cantilever arm extending away from the base;

a pendulous arm having a pivotal end and a free end spaced from the pivotal end, both ends locating the physical axis of such arm and of the accelerometer;

a coil supported in the free end of the pendulous arm, said coil serving as the means for generating a signal voltage;

stationary coil means adjacent the signal coil and serving, when energized, to establish a magnetic flux field in the path of movement of the movable coil;

and dynamo-electric means supported from the base structure and disposed transversely of the free end of the pendulous arm and serving, upon energization, to apply a restoring torque to the pendulous arm to restore the pendulous arm to neutral position;

said dynamo-electric restoring means including a stationary permanent magnet stator structure supported on and secured to the base, and disposed to define an air gap to locate a magnetic flux field;

a movable coil disposed in the air gap and supported on a physical element secured to the pendulous arm whereby such movable coil, when energized by an applied current, will be moved in said air gap, by reaction of the coil flux and the air gap flux field, to apply a restoring torque to the pendulous arm;

and resilient means supporting the pivotal end of the pendulous arm from said base, said supporting means including a floating beam secured to the pivotal end of the pendulous arm transversely to the physical axis, and a resilent connector between each end of the floating beam and one of the cantilever elements of the brackets.

12. An accelerometer to be disposed to operate in response to forces along a predetermined force axis, and disposed with its physical axis substantially parallel to an inertial longitudinal axis orthogonal to the force axis, said accelerometer comprising a base having a longitudinal dimension along said physical axis;

a pair of brackets secured to the base and spaced on the base transversely to the direction of the longitudinal dimension, each bracket having a cantilever arm extending away from the base;

a pendulous arm having a pivotal end and a free end spaced from the pivoted end, both ends locating the physical axis of such arm and of the accelerometer;

the brackets being L-shaped, with one arm of each bracket fixed to the base and the other arm extending as a cantilever from the base, the material of the brackets being such as to provide some resiliency between the two arms of the bracket about the corner bend thereof;

a cross-beam secured to and supported by the extending cantilever arms of the two brackets;

means supported on, and controlled by movement of, the free end of the pendulous arm for generating a signal voltage;

a resilient means supporting the pivotal end of the pendulous arm from said base, said supporting means including a floating beam secured to the pivotal end of the pendulous arm transversely to the physical axis, and a resilient connector between each end of the floating beam and one of the cantilever elements of the brackets;

said resilient means supporting the pivoted end of the pendulous arm being attached to the cross beam, and means for adjustably tilting the cross-beam and cantilever assembly to adjustably tilt the pendulous arm to a balanced neutral position to establish substantial parallelism between the physical axis of the pendulous arm and the inertial axis of the accelerometer, the means for adjustably tilting the cross-beam consisting of an adjusting lever having two ends, with its one end secured to the cross-beam and its second or free end disposed to extend longitudinally in the axial direction of the accelerometer, and means for impressing a transverse torque on the free end of the adjusting lever to minutely tilt the cross-beam, and, consequently, the pendulous arm, the adjusting lever being a tube having one end rigidly secured to the cross-beam and having its body extending concentrically along and outside of the pendulous arm in the direction toward the free end of the pendulous arm;

and the torque-impressing means comprising a pair of adjustably positionable threaded screws supported from structure on the base and disposed to apply a transverse force to either side of the adjusting lever to establish a bending force on the extending stand-off arms of the brackets.

13. A single-axis accelerometer, comprising a base having a generally longitudinal dimension in the direction of a predetermined inertial axis;

a pair of brackets secured to the base on opposite sides of such inertial axis and each bracket having a cantilever arm extending away from the base and directed to be resiliently movable in a direction parallel to the inertial axis;

a cross-bar connecting the two cantilever arms at their outer free ends;

a floating cross-beam;

means resiliently supporting the cross-beam from the cross-bar, said supporting means consisting of two spaced connectors between the respective ends of the cross-beam and the cross-bar;

each resilient connector consisting of a metal element having an axis and being axially disposed between the cross-beam and the cross-bar, the body of the metal element between the cross-beam and the cross-bar being fluted on diametrically opposite sides, whereby a thin section of the body of each metal element is formed to define a linear pivotal region orthogonal to the body axis.

a pendulous arm having its one end secured to the cross-beam and having its free end extending away from the cross-beam substantially parallel to said inertial axis;

signal-inducing means controlled by the free end of said pendulous arm to induce a signal voltage in response to an external force operating on the free end of the pendulous arm;

and means for adjustably tilting the cross-bar together with the cantilever arms to correspondingly tilt the floating beam and the pendulous arm;

the adjustable means for tilting the cross-bar consisting of a tubular element secured at its one end to the cross-bar and having its body extending coaxially along and concentrically around the pendulous arm and away from the cross-bar;

with adjustable means disposed in juxtaposed positions on diametrically opposite sides of the body of the tubular element, said adjustable means consisting of screw-thread elements to apply adjustable torques to the tubular element to tilt the cross-bar and thereby tilt the cross-beam to tilt the pendulous arm so the axis of the pendulous arm will parallel the inertial axis.

References Cited in the file of this patent

UNITED STATES PATENTS

| 17,870 | Cole | July 28, 1857 |
| 2,423,349 | Sonntag | July 1, 1947 |
| 2,744,335 | Litman | May 8, 1956 |
| 2,812,398 | Mickman | Nov. 5, 1957 |
| 2,839,733 | Bassett | June 17, 1958 |
| 2,843,001 | Werner | July 15, 1958 |
| 2,869,851 | Sedgfield et al. | Jan. 20, 1959 |

FOREIGN PATENTS

| 130,265 | Sweden | Dec. 5, 1950 |
| 159,078 | Sweden | June 4, 1957 |